(12) United States Patent
Tu et al.

(10) Patent No.: US 8,355,576 B2
(45) Date of Patent: Jan. 15, 2013

(54) METHOD AND SYSTEM FOR CROWD SEGMENTATION

(75) Inventors: Peter H. Tu, Nizkayuna, NY (US); Kenneth R. Turner, Bristow, VA (US); Jens Rittscher, Ballston Lake, NY (US); Thomas B. Sebastian, Niskayuna, NY (US); Nils Oliver Krahnstoever, Schenectady, NY (US); Gianfranco Doretto, Albany, NY (US); Ting Yu, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 778 days.

(21) Appl. No.: 12/457,543

(22) Filed: Jun. 15, 2009

(65) Prior Publication Data

US 2009/0310862 A1    Dec. 17, 2009

Related U.S. Application Data

(60) Provisional application No. 61/129,259, filed on Jun. 13, 2008.

(51) Int. Cl.
G06K 9/34 (2006.01)
G06K 9/62 (2006.01)

(52) U.S. Cl. .................... 382/173; 382/159; 382/225

(58) Field of Classification Search ............... 382/159, 382/173, 225
See application file for complete search history.

(56) References Cited

U.S. PATENT DOCUMENTS

| | | | |
|---|---|---|---|
| 6,381,363 B1 | 4/2002 | Murching et al. | |
| 6,404,925 B1 * | 6/2002 | Foote et al. | 382/224 |
| 6,526,169 B1 | 2/2003 | Murching et al. | |
| 7,149,325 B2 | 12/2006 | Pavlidis et al. | |
| 7,151,843 B2 | 12/2006 | Rui et al. | |
| 7,151,852 B2 | 12/2006 | Gong et al. | |
| 7,469,060 B2 | 12/2008 | Bazakos et al. | |
| 7,596,241 B2 * | 9/2009 | Rittscher et al. | 382/103 |
| 2005/0047646 A1 | 3/2005 | Jojic et al. | |
| 2005/0254546 A1 | 11/2005 | Rittscher et al. | |
| 2006/0215880 A1 | 9/2006 | Berthilsson et al. | |
| 2007/0003141 A1 * | 1/2007 | Rittscher et al. | 382/181 |
| 2007/0237393 A1 | 10/2007 | Zhang et al. | |
| 2008/0031493 A1 | 2/2008 | Brogren et al. | |
| 2008/0187220 A1 | 8/2008 | Doretto et al. | |
| 2008/0259163 A1 | 10/2008 | Yu et al. | |
| 2008/0260261 A1 | 10/2008 | Li et al. | |
| 2008/0273751 A1 | 11/2008 | Yuan et al. | |

(Continued)

OTHER PUBLICATIONS

Tu et al., "Crowd Segmentation Through Emergent Labeling," 2004, SMVP, pp. 187-198.*

(Continued)

Primary Examiner — John Strege
(74) Attorney, Agent, or Firm — Oliff & Berridge, PLC

(57) ABSTRACT

Aspects of the disclosure provide a method for crowd segmentation that can globally optimize crowd segmentation of an input image based on local information of the input image. The method can include receiving an input image of a site, initializing a plurality of hypothesis based on the input image, dividing the input image into a plurality of patches, calculating an affinity measure of one or more patches to a hypothesis based on a partial response of the patches to a whole body classifier of the hypothesis that includes a combination of weak classifiers, and optimizing assignments of the plurality of patches to the plurality of hypothesis based on the affinity measures of the plurality of patches to the plurality of hypothesis.

30 Claims, 8 Drawing Sheets

U.S. PATENT DOCUMENTS

2009/0034791 A1 2/2009 Doretto et al.
2009/0034793 A1* 2/2009 Dong et al. .................. 382/103

OTHER PUBLICATIONS

Tu et al., "Unified Crowd Segmentation," Oct. 12, 2008, ECCV 2008, vol. 5305, pp. 691-704.*
Leibe et al., "Pedestrian Detection in Crowded Scenes," Jun. 20, 2005, IEEE, pp. 878-885.*
Wu et al., "Detection and Tracking of Multiple Partially Occluded Humans by Bayesian Combination of Edgelet based Part Detectors," Jan. 11, 2007, pp. 247-266.*
Peter Tu et al., "Unified Crowd Segmentation," Computer Vision A ECCV 2008, Lecture Notes in Computer Science, Springer Berlin Heidelberg, Berlin, Heidelberg, vol. 5305, Oct. 12, 2008, pp. 691-704,XP019109356. ISBN: 978-3-540-88692-1, the whole document.
Rittscher J et al., "Simultaneous Estimation of Segmentation and Shape," Computer Vision and Pattern Recognition 2005 IEEE Computer Society Conference on, IEEE, Piscataway, NJ, USA, vol. 2, Jun. 20, 2005, pp. 486-493, XP010817636. ISBN: 978-0-7695-2372-9, the whole document.
Leibe B et al., "Pedestrian Detection in Crowded Scenes," Computer Vision and Pattern Recognition, 2005 IEEE Computer Society Conference on, IEEE, Piscataway, NJ, USA, vol. 1, Jun. 20, 2005, pp. 878-885, XP010817364. ISBN: 978-0-7695-2372-9, abstract.
Bo Wu et al., "Detection and Tracking of Multiple, Partially Occluded Humans by Bayesian Combination of Edgelet based Part Detectors," International Journal of Computer Vision, Kluwer Academic Publishers, BO, vol. 75, No. 2, Jan. 11, 2007, pp. 247-266, XP019534969, ISSN: 1573-1405, abstract.
International Preliminary Report on Patentability issued in International Application No. PCT/US2009/047386 on Dec. 14, 2010.
Written Opinion of the International Searching Authority issued in International Application No. PCT/US2009/047386 on Dec. 14, 2010.

* cited by examiner

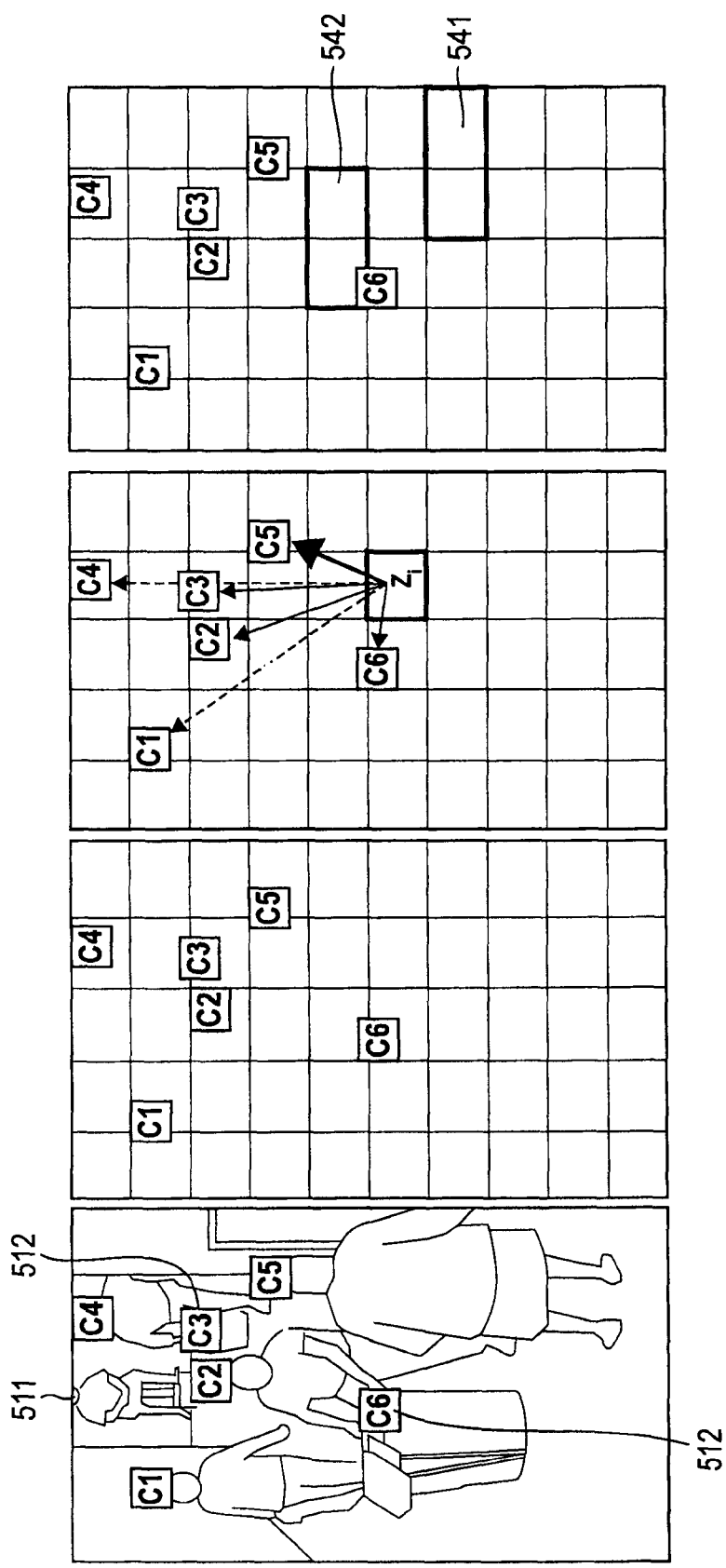

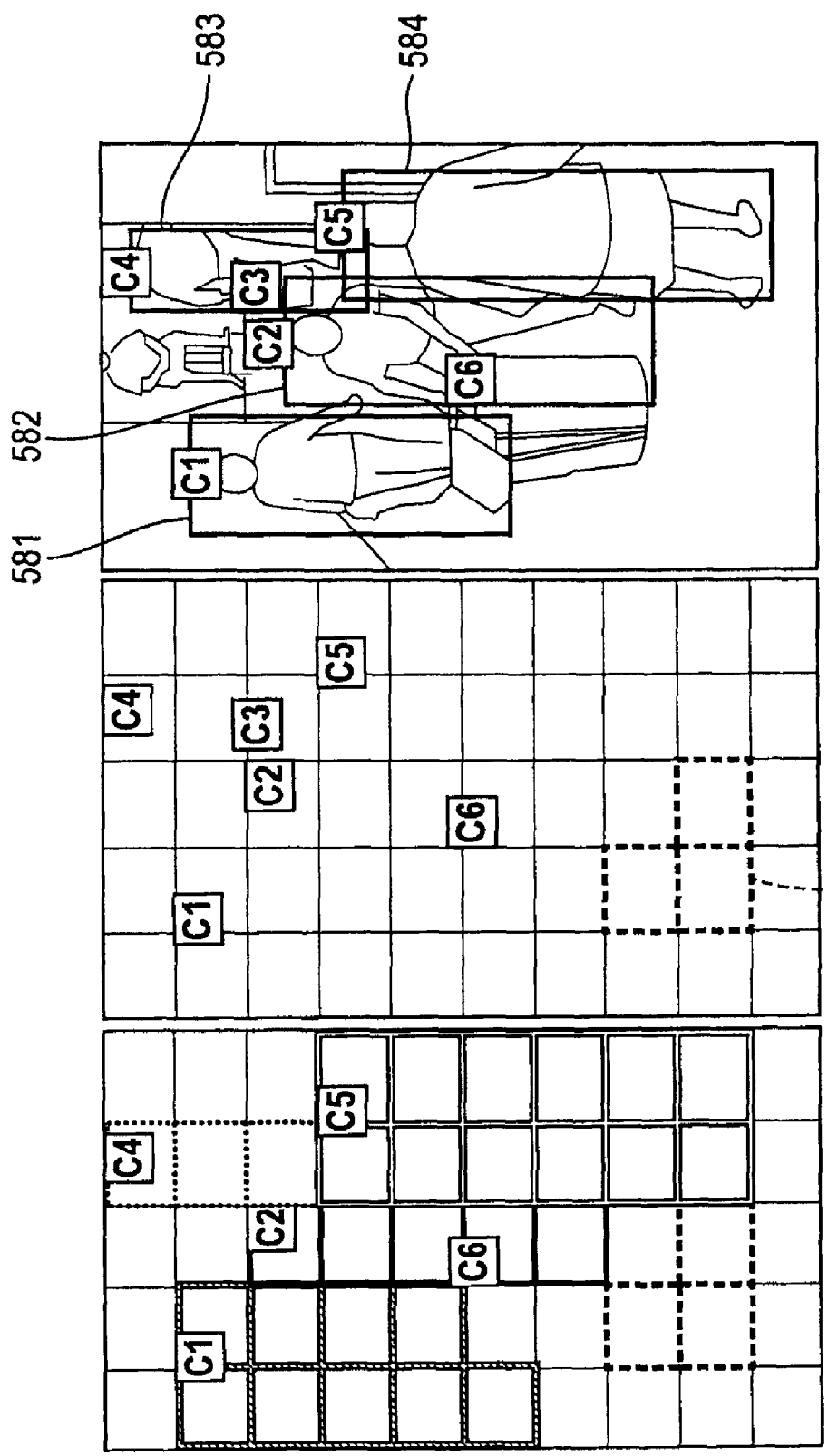

METHOD AND SYSTEM FOR CROWD SEGMENTATION

INCORPORATION BY REFERENCE

This application claims the benefit of U.S. Provisional Application No. 61/129,259, "Appearance Based Crowd Segmentation" filed on Jun. 13, 2008, which is incorporated herein by reference in its entirety.

BACKGROUND

Computer vision applications can use segmentation techniques to detect and track individuals in crowds. For example, an automatic video surveillance system can be used in public area, such as airports, mass-transit stations, sports stadiums, and the like, that can be crowded with persons and non-person objects. The automatic video surveillance system may segment individuals from non-personal objects and the crowds, and then track the individuals.

SUMMARY

Aspects of the disclosure can provide a method for crowd segmentation that can globally optimize crowd segmentation of an input image based on local information of the input image. The method can include receiving an input image of a site, initializing a plurality of hypothesis based on the input image, dividing the input image into a plurality of patches, calculating an affinity measure of one or more patches to a hypothesis based on a partial response of the patches to a whole body classifier of the hypothesis that includes a combination of weak classifiers, and optimizing assignments of the plurality of patches to the plurality of hypothesis based on the affinity measures of the plurality of patches to the plurality of hypothesis.

To initialize the plurality of hypothesis based on the input image, the method can include detecting head and shoulder locations in the input image. To detect the head and shoulder locations in the input image, the method can include calculating a response to a head and shoulder classifier for a location, determining the location as a hypothesis based on the response.

To divide the input image into the plurality of patches, the method can include determining a patch size based on the whole body classifier.

According to an aspect of the disclosure, the method can also include constructing the whole body classifier based on training data of the site.

In an embodiment, to calculate the affinity measure of the patches to the hypothesis based on the partial response of the patches to the whole body classifier of the hypothesis, the method can include at least one of calculating a direct affinity measure of a patch to the hypothesis, and calculating a pairwise affinity measure of a pair of patches to a hypothesis.

To calculate the pairwise affinity measure of the pair of patches to the hypothesis, the method can include calculating a similarity measure of the pair of patches. Further, the method can calculate the similarity measure of the pair of patches based on at least one of motion consistency and color consistency.

To calculate the direct affinity measure of the patch to the hypothesis, the method can include calculating a statistic over an intersection of the patch and a region of a weak classifier that is within the combination of the weak classifiers for the whole body classifier, calculating a response of the patch to the weak classifier based on the statistic, and scaling the response based on a ratio of the intersection and the region of the weak classifier.

To optimize assignments of the plurality of patches to the plurality of hypothesis based on the affinity measures of the plurality of patches to the plurality of hypothesis, the method can include optimizing a global assignment of the patches to the plurality of hypothesis using an EM algorithm. More specifically, the method can include initializing consistency parameters, computing an assignment distribution based on fixed consistency parameters in an E-step, and updating the consistency parameters to enforce a consistency of the global assignment in an M-step.

Aspects of the disclosure can provide an image processing device for crowd segmentation. The image processing device can include an image input unit, a processing unit and an output unit. The image input unit can be configured to receive an input image of a site. The processing unit can be configured to initialize a plurality of hypothesis based on the input image, divide the input image into a plurality of patches, calculate an affinity measure of one or more patches to a hypothesis based on a partial response of the patches to a whole body classifier of the hypothesis, and optimize assignments of the plurality of patches to the plurality of hypothesis based on the affinity measures of the plurality of patches to the plurality of hypothesis. The output unit can be configured to output the optimized assignments of the plurality of patches to the plurality of hypothesis.

The processing unit may include a head and shoulder detector to detect head and shoulder locations in the input image. The head and shoulder detector may be configured to calculate a response to a head and shoulder classifier for a location, and determine the location as a hypothesis based on the response.

According to an embodiment of the disclosure, the processing unit can be configured to calculate at least one of a direct affinity measure of a patch to a hypothesis and a pairwise affinity measure of a pair of patches to a hypothesis.

To calculate the pairwise affinity measure, the processing unit can be configured to calculate a similarity measure of the pair of patches based on at least one of a motion constancy and a color constancy.

To calculate the direct affinity measure, the processing unit can be configured to calculate a statistic over an intersection of the patch and a region of a weak classifier within the whole body classifier, calculate a response of the patch to the weak classifier based on the statistic, and scale the response based on a ratio of the intersection and the region of the weak classifier.

To optimize the assignments, the processing unit can be configured to optimize a global assignment of the patches to the plurality of hypothesis in an E-step of an EM algorithm, and enforce a consistency of the global assignment in an M-step of the EM algorithm.

Aspects of the disclosure can also provide a computer readable medium storing program instructions for causing a controller to perform crowd segmentation steps. The crowd segmentation steps can include receiving an input image of a site, initializing a plurality of hypothesis based on the input image, dividing the input image into a plurality of patches, calculating an affinity measure of one or more patches to a hypothesis based on a partial response of the patches to a whole body classifier of the hypothesis that includes a combination of weak classifiers, and optimizing assignments of the plurality of patches to the plurality of hypothesis based on the affinity measures of the plurality of patches to the plurality of hypothesis.

BRIEF DESCRIPTION OF THE DRAWINGS

Various exemplary embodiments of this disclosure will be described in detail with reference to the following figures, wherein like numerals reference like elements, and wherein:

FIGS. 5A-5H show exemplary plots illustrating steps of an appearance based crowd segmentation process according to an embodiment of the disclosure.

DETAILED DESCRIPTION OF EMBODIMENTS

Figure 1:
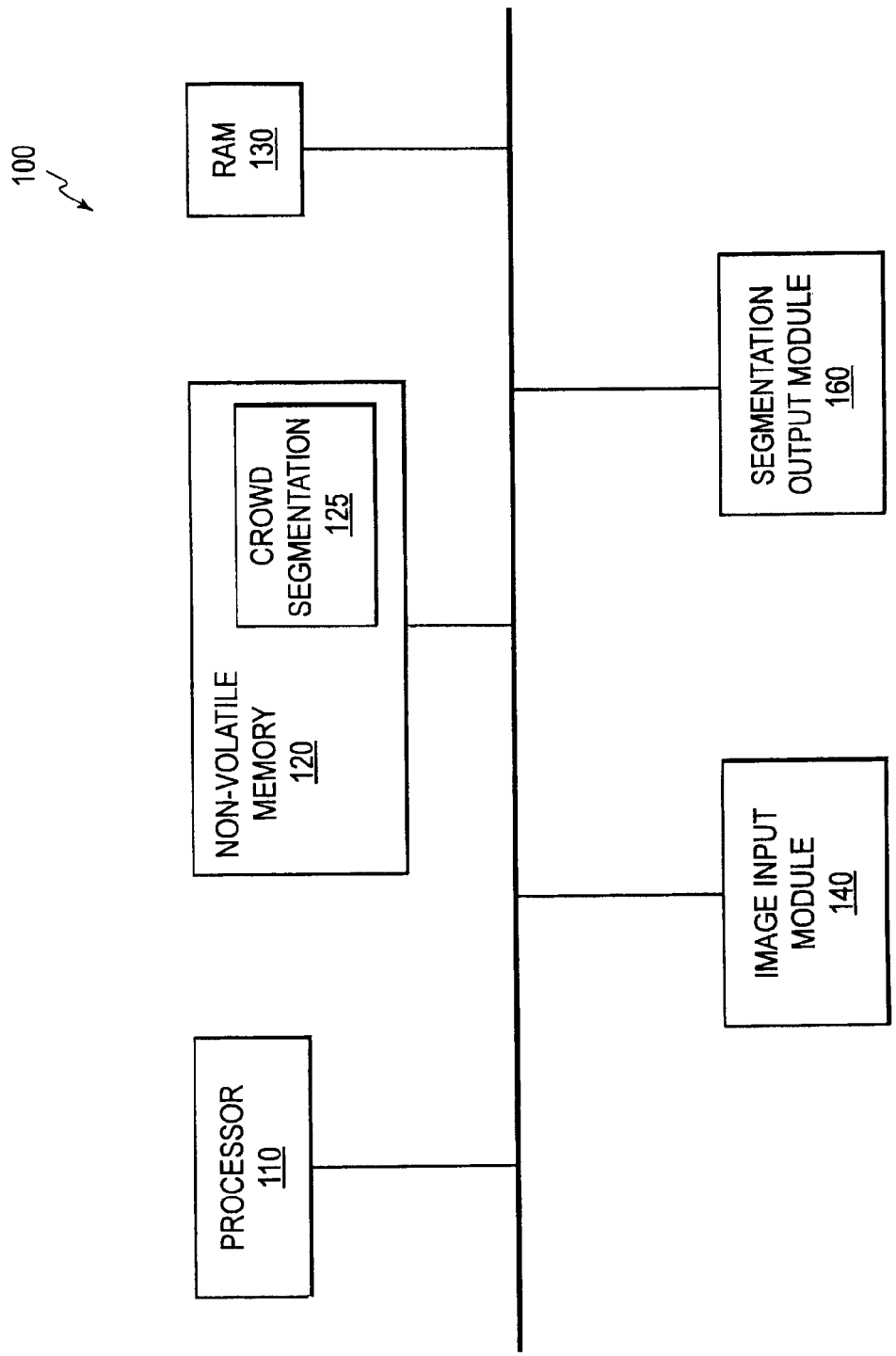
FIG. 1 shows a block diagram of an exemplary crowd segmentation system according to an embodiment of the disclosure.

FIG. 1 shows a block diagram of an exemplary crowd segmentation system according to an embodiment of the disclosure. The crowd segmentation system 100 can include various components, such as a processor module 110, a non-volatile memory unit 120, a random access memory (RAM) unit 130, an image input module 140, a segmentation output module 160, and the like. These elements can be coupled together as shown in FIG. 1.

The processor module 110 can execute system and application codes. More specifically, the processor module 110 may execute system codes to maintain an appropriate status of the crowd segmentation system 100. Further, the processor module 110 can execute application codes to control the crowd segmentation system 100 to perform specific functions. For example, the processor module 110 may execute codes for appearance based crowd segmentation. It is noted that the processor module 110 may include one or more processors for performing required functions.

The non-volatile memory unit 120 can store system and application codes that generally do not change, such as firmware. The non-volatile memory 120 may store appearance based crowd segmentation codes 125. The appearance based crowd segmentation codes 125 can be executed by the processor module 110 to perform a crowd segmentation on an input image.

The non-volatile memory unit 120 may use various memory media to store the appearance based crowd segmentation codes 125. In an embodiment, the non-volatile memory unit 120 may use semiconductor memory devices, such as electrically programmable read-only memory (EPROM), electrically erasable programmable read-only memory (EEPROM), and the like, that can hold information even when power is off. In another embodiment, the non-volatile memory unit 120 may use a magnetic storage medium, such as a hard drive, that can magnetically store the codes. In another embodiment, the non-volatile memory unit 120 may use an optical storage medium, such as compact disc (CD), digital video disc (DVD), and the like, that can optically store the codes.

The RAM unit 130 is writeable and readable, and can be accessed at a fast speed. It can be preferred that data and codes are in the RAM unit 130 for the processor module 110 to access during operation. In an example, the crowd segmentation system 100 may include a memory management unit (not shown). The memory management unit can copy codes from the non-volatile memory unit 120 to the RAM unit 130 for the processor module 110 to execute.

The image input module 140 can include various imaging devices, such as camera, camcorder, and the like, that can provide the crowd segmentation system 100 with input images. In another embodiment, the image input module 140 may include an interface that can couple various imaging devices to the crowd segmentation system 100.

The segmentation output module 160 can be configured to output crowd segmentation results. In an example, the segmentation output module 160 can include a display device that can superimpose crowd segmentation results on the input image for displaying.

Figure 2:
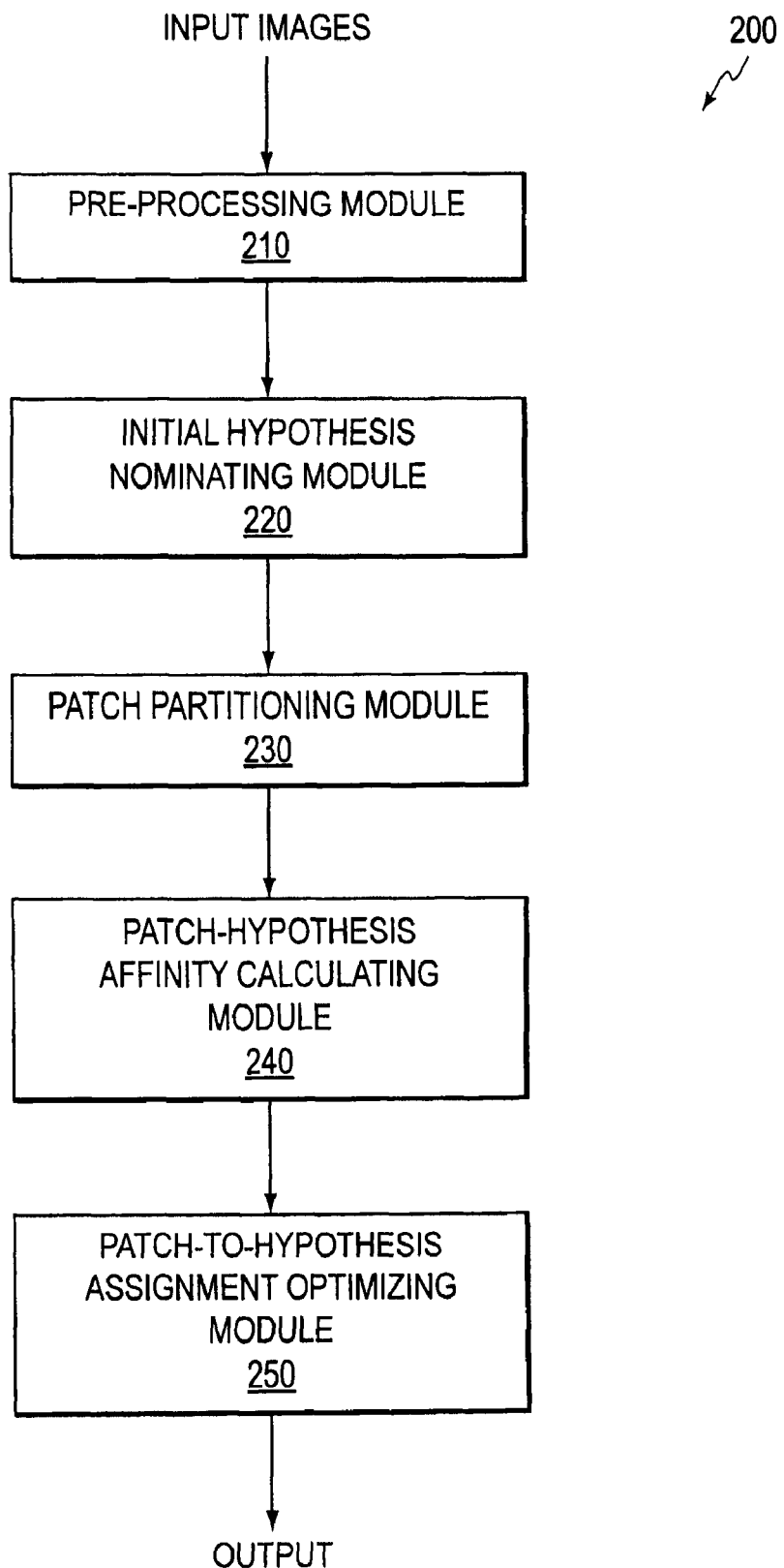
FIG. 2 shows a functional block diagram of an exemplary appearance based crowd segmentation system according to an embodiment of the disclosure.

FIG. 2 shows a functional block diagram of an exemplary appearance based crowd segmentation system according to an embodiment of the disclosure. The appearance based crowd segmentation system 200 can include a preprocessing module 210, a hypothesis nominating module 220, a patch partitioning module 230, a patch hypothesis affinity calculating module 240, and a patch-to-hypothesis assignment optimizing module 250.

The preprocessing module 210 can receive an input image, such as video images or still photos. The preprocessing module 210 can perform various functions to prepare the input image for further processing. For example, the preprocessing module 210 may convert data format of the input image to an internal data structure. In addition, the preprocessing module 210 may adjust various image attributes, such as size, color, contrast, and the like, of the input image. In an embodiment, the preprocessing module 210 may obtain camera calibration information, for example, from the imaging device that takes the input image. The preprocessed input image can be sent to the hypothesis nominating module 220.

The hypothesis nominating module 220 can receive the preprocessed input image, and nominate a set of hypothesis, such as a set of individuals from the input image. The hypothesis nominating module 220 may use various techniques to nominate the set of hypothesis. In an embodiment, the hypothesis nominating module 220 may use a scanning window approach to scan the input image for possible individuals.

In an example, the hypothesis nominating module 220 may use a head and shoulder detector to detect the set of hypothesis. More specifically, the hypothesis nominating module 220 may move a scanning window on the input image. The scanning window can expose a portion of the input image. The exposed portion can be evaluated by the head and shoulder detector. In an embodiment, the head and shoulder detector can include a head and shoulder classifier, and calculate a response of the exposed portion to the head and shoulder classifier. Further, the response can be used to determine whether to nominate the exposed portion. For example, when the response is positive, the exposed portion can be nominated for a hypothesis; and when the response is negative, no nomination is made for the exposed portion.

In another embodiment, the head and shoulder detector can use a whole body classifier to determine a nomination for the exposed portion. The whole body classifier may be configured as a combination of various weak classifiers. Each weak classifier may operate on a specific region of a body. The head and shoulder detector may calculate a partial response of the exposed portion to the whole body classifier, and determine whether to nominate the exposed portion based on the partial response. For example, when the partial response is larger than a threshold, the exposed portion can be nominated for a hypothesis; otherwise, no nomination is made for the exposed portion.

According to an aspect of the disclosure, parameters of the head and shoulder detector can be suitably adjusted to minimize missed detections. For example, the head and shoulder detector may reduce the threshold for making nominations. Thus, the number of missed detections can be reduced. However, a number of false detections may increase. The false detections can be identified and removed by the other processing modules of the appearance based crowd segmentation system 200.

Further, the hypothesis nominating module 220 can assign a bounding box for each hypothesis. The bounding box can cover an entire body region of the hypothesis. Generally, the bounding box can be determined based on a head location of the hypothesis and the camera calibration information, for example, under the dominant ground plane assumption. Thus, the hypothesis can be defined by the head location of the hypothesis and the bounding box.

The patch partitioning module 230 can partition the input image into a plurality of patches. In an embodiment, the input image can be partitioned into a plurality of rectangular patches. According to an aspect of the disclosure, the patch partitioning module 230 may determine a patch size, and partition the input image based on the patch size. In an example, when a patch size is larger than a threshold, a patch response to a whole body classifier can be affected by an occlusion in the patch. On the other hand, when a patch size is smaller than a threshold, a patch response to the whole body classifier can have a reduced ability to determine patch assignment. Alternatively, the patch partitioning module 230 may use a pre-learned patch size, such as about 0.5 person width, to partition the input image.

The patch hypothesis affinity calculating module 240 can calculate various patch to hypothesis affinity measures, such as direct patch to hypothesis affinity measure, pairwise patch to hypothesis affinity measure, and the like.

In an example to calculate a direct affinity measure of a patch to a hypothesis, the patch hypothesis affinity calculating module 240 can calculate a partial response of the patch to a whole body classifier of the hypothesis as shown by Eq. 1:

$$g_k(z_i) = sc(s_k, z_i) \qquad \text{Eq. 1}$$

where $s_k$ denotes $k^{th}$ hypothesis, $z_i$ denotes $i^{th}$ patch, $g_k(z_i)$ denotes a direct affinity measure of the $i^{th}$ patch to the $k^{th}$ hypothesis, and $sc(s_k, z_i)$ denotes a partial response of the $i^{th}$ patch to a whole body classifier for the $k^{th}$ hypothesis.

According to an embodiment of the disclosure, a whole body classifier can produce a positive response or a negative response for a whole body sample. Generally, a whole body classifier can include a plurality of weak classifiers. Each weak classifier may have a region of interest, such as head, shoulder, torso, legs, and the like. Thus, a response of the whole body sample to the whole body classifier can be calculated by calculating a combination of responses of the whole body sample to the plurality of weak classifiers, such as shown in Eq. 2:

$$sc(s) = \sum_{l=1}^{M} \alpha_l wc(s; R_l(s)) \qquad \text{Eq. 2}$$

where $sc(s)$ denotes a response of a whole body sample s to a whole body classifier, M denotes a number of weak classifiers, $\alpha_l$ denotes a coefficient assigned to the $l^{th}$ weak classifier, $R_l(s)$ denotes a region of interest of the $l^{th}$ weak classifier defined relative to the whole body sample s, and $wc(s;R_l(s))$ denotes a response of the whole body sample s to the $l^{th}$ weak classifier.

Generally, a weak classifier can be specified by an image feature, a region of interest, a threshold, polarity, and the like. Thus, a response of a whole body sample to the weak classifier can be calculated based on a comparison of the threshold to a feature statistic in the region of interest of the whole body sample. For example, when an average feature in the region of interest of the whole body sample is larger than the threshold, the weak classifier may produce a positive response, and when the average feature in the region of interest is smaller than the threshold, the weak classifier may produce a negative response.

In an embodiment, a whole body classifier can be constructed based on a boosting process. The boosting process can construct a sequence of classifiers by emphasizing training data that the current classifier fails on. This process can be repeated a number of times so as to construct a sequence of cascaded classifiers. Then, the sequence of cascaded classifiers can be combined to form the whole body classifier.

According to an embodiment of the disclosure, the partial response of the patch to the whole body classifier associated with the hypothesis can be calculated by a combination of modulated responses of the patch to a plurality of weak classifiers of the whole body classifier, such as shown in Eq. 3

$$sc(s_k, z_i) = \sum_{l=1}^{M} \alpha_l wc_l(s_k, z_i) \frac{\int_{R_l(s) \cap z} dx}{\int_{R_l(s)} dx} \qquad \text{Eq. 3}$$

where $wc_l(s_k, z_i) = wc(s_k; R_l(s_k) \cap z_i)$, and denotes a response of the patch to the $l^{th}$ weak classifier. The response can be evaluated based on a comparison of the $l^{th}$ weak classifier threshold to an average feature collected over an intersection of the region of interest of the $l^{th}$ weak classifier and the patch. In addition, the response can be modulated by an area ratio of the intersection and the region of interest, as shown in Eq. 3. The modulated response can be summed as the partial response to the whole body classifier.

In an example to calculate a pairwise affinity measure of a pair of patches to a hypothesis, the patch hypothesis affinity calculating module 240 can calculate a product of a similarity measure of the pair of patches, and a minimum of the direct affinity measures of the pair of patches to the whole body classifier of the hypothesis, such as shown in Eq. 4:

$$g_k(z_i, z_j) = sim(z_i, z_j) \min(g_k(z_i), g_k(z_j)) \qquad \text{Eq. 4}$$

where $sim(z_i, z_j)$ denotes the similarity measure, and $\min(g_k(z_i), g_k(z_j))$ denotes the minimum of the direct affinity measures of the patches to the whole body classifier of the hypothesis. The similarity measure can be calculated using various image cues, such as motion fields and color distributions. In an example, a Bhattacharya distance measure between the color histogram of the pair of patches can be used as the similarity measure.

The patch-to-hypothesis assignment optimization module 250 can use a global optimization method that is based on local information. In an embodiment, the patch-to-hypothesis assignment optimization module 250 may use an EM algorithm to iteratively optimize the patch to hypothesis assignment based on the affinity measures. The patch-to-hypothesis assignment optimization module 250 may iteratively execute an E step and an M step of the EM algorithm until a converged patch-to-hypothesis assignment is obtained.

In an example, the patch-to-hypothesis assignment optimization module 250 may define an assignment vector $V=\{v_i\}$ for N patches to K hypothesis. The assignment vector V can have a length of N, and each element variable $v_i \in [1, 2 \ldots, K]$. When a patch $z_i$ is assigned to a hypothesis $c_k$, $v_i=k$. Further, the patch-to-hypothesis assignment optimization module 250 can define a log likelihood of the patch-to-hypothesis assignment based on patch to hypothesis affinity measures, such as shown in Eq. 5:

$$L(V \mid Z; X) \propto \gamma_1 \sum_{k=1}^{K} \sum_{i=1}^{N} x_{ik} g_k(z_i) \delta_{ck}(v_i) + \gamma_2 \sum_{k=1}^{K} \sum_{\substack{i,j=1 \\ i \neq j}}^{N} x_{ik} x_{jk} g_k(z_i, z_j) \delta_{ck}(v_i) \delta_{ck}(v_j) \quad \text{Eq. 5}$$

where $\delta_{c_k}(v_i)$ denotes an indicator function, which can be "1" when $v_i=k$ and "0" otherwise; $x_{ik}$ denotes a consistency parameter that can be initialized, and iteratively updated based on a consistency rule. Further, the patch-to-hypothesis assignment optimization module 250 can calculate an assignment distribution in the E-step based on fixed consistency parameters, then update the consistency parameters in the M-step.

During the E-step, for example, the patch-to-hypothesis assignment optimization module 250 can fix the consistency parameters, and compute assignment probabilities p(V), such that the expectation function $$\int_V p(V) L(V \mid Z; X)$$

can be maximized. In an embodiment, the patch-to-hypothesis assignment optimization module 250 may use a soft-assign mechanism to perform the E-step. The soft-assign mechanism may use multiple iterations. In an example, the soft-assign mechanism can initialize the assignment probability to be uniform before a first iteration. Then, during each iteration of the soft-assign process, the assignment probabilities can be updated based on a gradient of the expectation function $$\int_V p(V) L(V \mid Z; X).$$

After a number of iterations, the assignment probabilities can be forced to take on binary values, and define an estimate of the most likely value of V. When a hypothesis receives no patch assignment, the hypothesis can be considered as a false detection, that can be removed. In an embodiment, the patch-to-hypothesis assignment optimization module 250 may include a null hypothesis that can be used for background and/or non-person objects in a site.

During the M-step, the patch-to-hypothesis assignment optimization module 250 can apply consistency rules to update the consistency parameters. In certain circumstances, the E-step may produce inconsistent patch assignments, and the M-step can update the consistency parameters to reduce the possibility of the inconsistent patch assignments.

In an example, the patch-to-hypothesis assignment optimization module 250 can enforce consistency based on an occlusion reasoning, that can be expressed as: if a person is visible, then the head and shoulder of the person is visible and the non-occluded region of a person should be contiguous.

Thus, for each patch $z_i$ that is assigned to a hypothesis $c_k$, the patch-to-hypothesis assignment optimization module 250 may construct a path from the patch $z_i$ to the head position defined by the hypothesis $c_k$, such that a number of patches on the path that are not assigned to $c_k$ can be minimal. In an embodiment, the patch-to-hypothesis assignment optimization module 250 may use dynamic programming to construct the path. Then, the patch-to-hypothesis assignment optimization module 250 can update the consistency parameter $x_{ik}$ based on the number of patches on the path that are not assigned to $c_k$. For example, when the number of patches on the path that are not assigned to $c_k$ are smaller than a threshold, the consistency parameter $x_{ik}$ may keep its value, otherwise, the consistency parameters $x_{ik}$ may be assigned a reduced value. When the consistency parameters $x_{ik}$ has a reduced value, the patch $z_i$ can have a reduced possibility to be assigned to the hypothesis $c_k$.

The patch-to-hypothesis assignment optimization module 250 can iteratively execute the E-step and the M-step until the assignment V converges. The converged assignment can be provided to, for example, a tracking module to track individuals in the input images.

In an embodiment, the processing modules of the appearance based crowd segmentation system 200 can be implemented as software codes that may be executed by one or more processors. In another embodiment, one or more of the processing modules may be implemented as hardware units to perform the specific functions.

Figure 3:
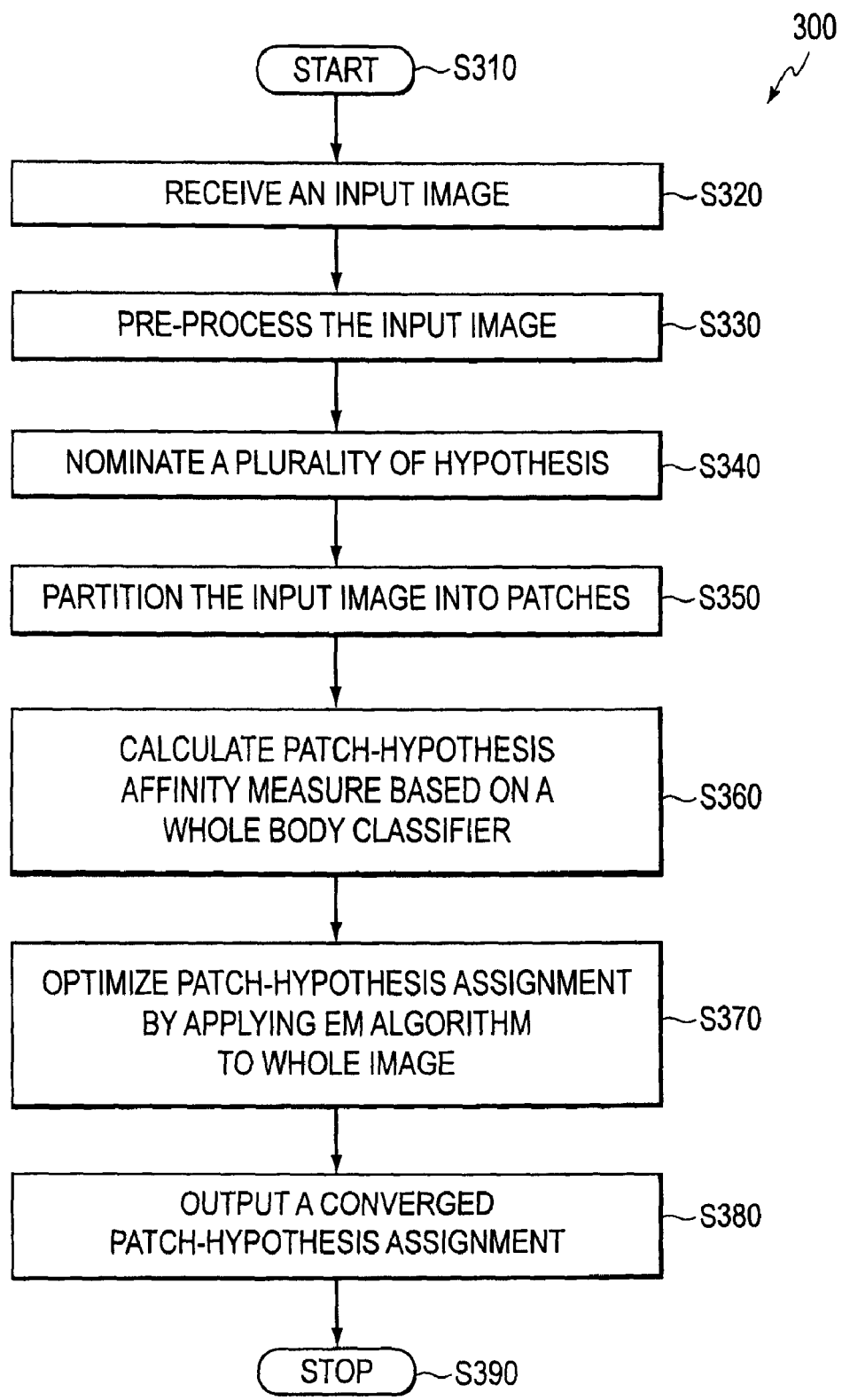
FIG. 3 shows a flow chart outlining an exemplary appearance based crowd segmentation process according to an embodiment of the disclosure.

FIG. 3 shows a flow chart outlining an exemplary appearance based crowd segmentation process according to an embodiment of the disclosure. The appearance based crowd segmentation process 300 starts at step S310, and proceeds to step S320.

In step S320, a crowd segmentation system, such as the appearance based crowd segmentation system 100 and 200, may receive an input image. The input image can be video images or still photos, and can be taken by any suitable imaging devices, such as camera, camcorder, surveillance monitor, and the like. Then, the process proceeds to step S330.

In step S330, the input image can be preprocessed. In an example, the data format of the input image can be converted to an internal data structure. In another example, various image attributes, such as size, color, contrast, and the like, of the input image, can be adjusted. In addition, camera calibration information can be obtained from the imaging device that takes the input image. The process then proceeds to step S340.

In step S340, a plurality of hypothesis, such as a set of individuals from the input image can be nominated. Various techniques can be used to nominate the plurality of hypothesis. In an embodiment, a scanning window approach can be used to scan the input image for possible individuals. More specifically, the scanning window can expose a portion of the input image. The exposed portion can be evaluated by a head and shoulder detector. In an embodiment, the head and shoulder detector can include a head and shoulder classifier, and calculate a response of the exposed portion to the head and shoulder classifier. Further, the response can be used to determine whether to nominate the exposed portion. For example, when the response is positive, the exposed portion can be nominated for a possible individual; and when the response is negative, no nomination is made for the exposed portion.

In another embodiment, the head and shoulder detector can use a whole body classifier to determine a nomination for the exposed portion. The whole body classifier may be configured as a combination of various weak classifiers. Each weak classifier may operate on a specific region relative to a bounding box of the whole body classifier. The head and shoulder detector may calculate a partial response of the exposed portion to the whole body classifier, and determine whether to nominate the exposed portion based on the partial response. For example, when the partial response is larger than a threshold, the exposed portion can be nominated for a possible individual; otherwise, no nomination is made for the exposed portion.

According to an aspect of the disclosure, parameters of the head and shoulder detector can be suitably adjusted to minimize missed detections. For example, the head and shoulder detector may reduce the threshold for making nominations. Thus, the number of missed detections can be reduced. However, a number of false detections may increase. The false detections can be identified and removed by further processing.

Then, each hypothesis may be assigned a bounding box covering an entire body region of the hypothesis. Generally, the bounding box can be determined based on a head location of the hypothesis and the camera calibration information, for example, under the dominant ground plane assumption. Thus, the hypothesis can be defined by the head location of the hypothesis and the bounding box. In an embodiment, a hypothesis may be associated with a whole body classifier. The whole body classifier may include regional classifiers, such as weak classifiers, with regions defined relative to the bounding box. Then, the process proceeds to step S350.

In step S350, the input image can be partitioned into a plurality of patches. In an embodiment, the input image can be partitioned into a plurality of rectangular patches. According to an aspect of the disclosure, a patch size may be determined to improve the appearance based crowd segmentation process. For example, when a patch size is larger than a threshold, a patch response to a whole body classifier can be affected by an occlusion in the patch. On the other hand, when a patch size is smaller than a threshold, a patch response to the whole body classifier can have a reduced ability to determine patch assignment. Then, the process proceeds to step S360.

In step S360, various patch to hypothesis affinity measures, such as direct affinity measure, pairwise affinity measure, and the like, can be calculated. In an example, a direct affinity measure of a patch to a hypothesis can be calculated based on a partial response of the patch to a whole body classifier of the hypothesis as shown by Eq. 1. Further, the partial response of the patch to the whole body classifier can be calculated based on a combination of modulated responses of the patch to a plurality of weak classifiers of the whole body classifier, such as shown in Eq. 3.

In another example, a pairwise affinity measure of a pair of patches to a hypothesis can be calculated by a product of a similarity measure of the pair of patches, and a minimum of the direct affinity measures of the pair of patches to the whole body classifier of the hypothesis, such as shown in Eq. 4. The similarity measure can be calculated using various image cues, such as motion fields and color distributions. In an example, a Bhattacharya distance measure between the color histogram of the pair of patches can be used as the similarity measure. Then, the process proceeds to step S370.

In step S370, a global optimization of patch-to-hypothesis assignment can be performed based on local information, such as the various patch to hypothesis affinity measures of the input image. In an embodiment, an EM algorithm can be used to iteratively optimize the patch to hypothesis assignment globally based on the affinity measures. The EM algorithm may iteratively execute an E step and an M step until a converged patch-to-hypothesis assignment is obtained. Then, the process proceeds to step S380.

In step S380, the converged patch-to-hypothesis assignment can be output. In an example, the converged patch-to-hypothesis assignment can be output to another module, such as a tracking module, to further process the input image. In another example, the converged patch-to-hypothesis assignment can be output to a display device that may superimpose the assignment with the input image. Then, the process proceeds to step S390 and terminates.

Figure 4:
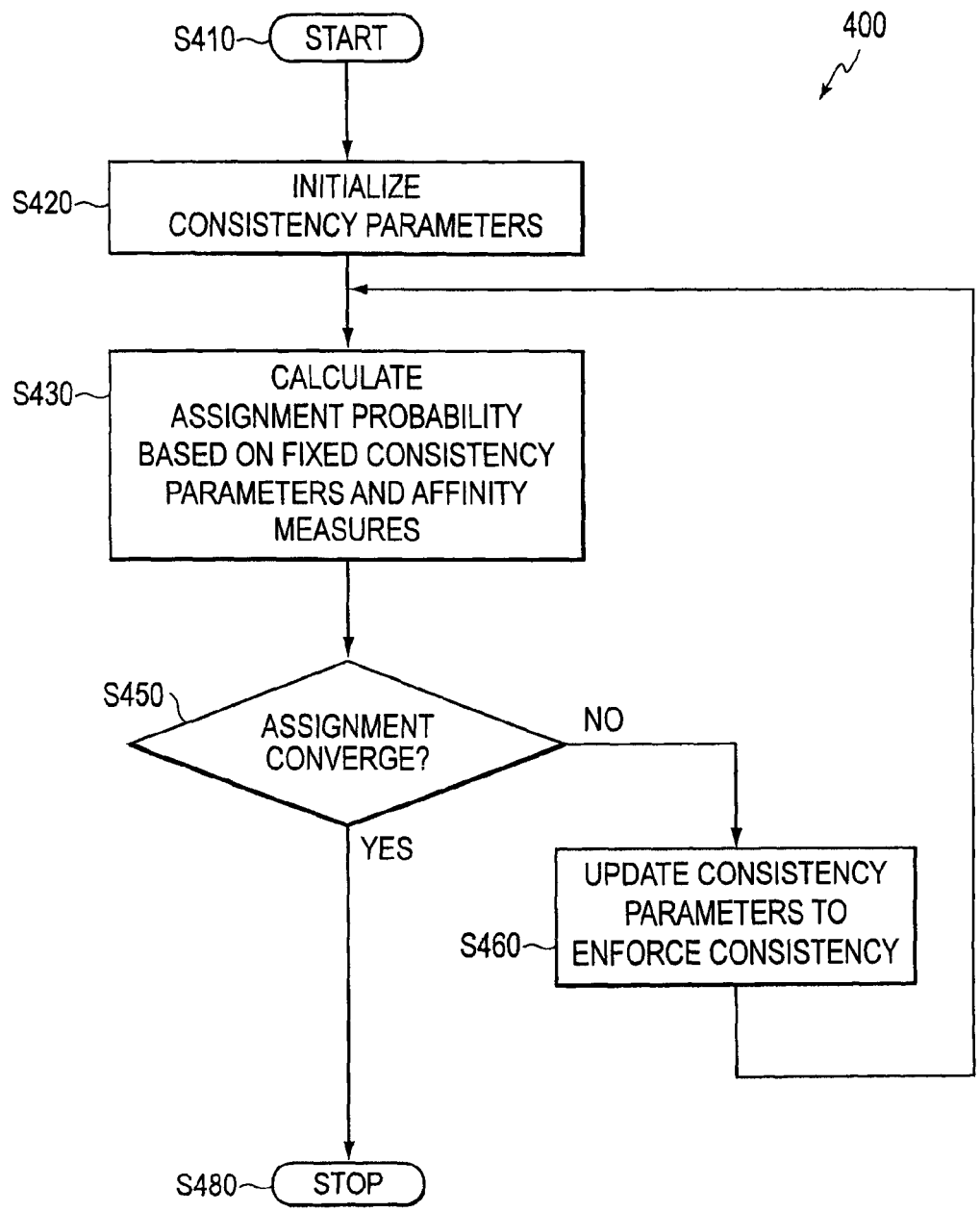
FIG. 4 shows a flow chart outlining an exemplary EM process for optimizing patch-to-hypothesis assignment according to an embodiment of the disclosure.

FIG. 4 shows a flow chart outlining an exemplary optimization process that use an EM algorithm to globally optimize patch-to-hypothesis assignment based on the patch to hypothesis affinity measures. The process starts at step S410 and proceeds to step S420.

In step S420, the optimization process can initialize consistency parameters for affinity measures. Each consistency parameter can weight a corresponding affinity measure in a term of a probability calculation. In an example, the consistency parameters can be initialized as "1" for all the terms. Then, the process proceeds to step S430.

In step S430, the optimization process may calculate assignment probabilities in the E-step of the EM algorithm. The assignment probabilities may be calculated to maximize an expectation function for a log likelihood of the patch-to-hypothesis assignments. The log likelihood of the patch-to-hypothesis assignments can be defined based on the various affinity measures and the consistency parameters that weight the affinity measures, such as shown in Eq. 5.

In an embodiment, the E-step may use a soft-assign mechanism. The soft-assign mechanism may use multiple iterations. In an example, the soft-assign mechanism can initialize the assignment probabilities to be uniform before a first iteration. Then, during each iteration of the soft-assign process, the assignment probabilities can be updated based on a gradient of the expectation function. After a number of iterations, the assignment probabilities can be forced to take on binary values, and define an estimate of the most likely assignment. Then, the process proceeds to step S450.

In step S450, the optimization process may determine whether the patch-to-hypothesis assignment converges. When the patch-to-hypothesis assignment converges, the process proceeds to step S470 and terminates; otherwise, the process proceeds to step S460.

In step S460, the optimization process may update the consistency parameters to enforce consistency according to the M-step of the EM algorithm. In certain circumstances, the E-step may produce inconsistent patch-to-hypothesis assignments, the M-step can update the consistency parameters to reduce the possibility of the inconsistent patch-to-hypothesis assignments.

In an example, an occlusion reasoning can be used. The occlusion reasoning can be expressed as if a person is visible, then the head and shoulder of the person is visible, and the non-occluded region of a person should be contiguous.

In an example of the M-step, a path from a patch to a head position defined by a hypothesis can be constructed, such that a number of patches on the path that are not assigned to the hypothesis can be minimal. Then, when the number of patches on the path that are not assigned to the hypothesis are smaller than a threshold, the corresponding consistency parameter for weighting the affinity measure may keep its value, otherwise, the corresponding consistency parameter may be assigned a reduced value. When the consistency parameter has a reduced value, the affinity measure for a patch to a hypothesis can be weighted less, and the patch can have a reduced possibility to be assigned to the hypothesis. Then, the process returns to step S430 to calculate the patch assignment based on the updated consistency parameters.

FIGS. 5A-5H show exemplary plots illustrating steps of an appearance based crowd segmentation process according to an embodiment of the disclosure.

FIG. 5A shows an input image with an initial nomination of a plurality of hypothesis detected by a head and shoulder detector. When a person's head and shoulder are not in the input image, such as 511, the person is not nominated. However, the head and shoulder detector may be suitable adjusted to minimize missed detections. Thus, the nomination may include false detections, such as 512.

FIG. 5B shows the input image that is partitioned into a grid of patches.

FIG. 5C shows direct affinity measures of a patch to the plurality of hypothesis. The values of the affinity measures are represented by widths of arrow lines from the patch to the hypothesis. When the patch is outside of a bounding box for a hypothesis, the direct affinity measure can be zero, which can be represented by a dashed arrow.

FIG. 5D shows pairwise affinity measure examples. A pairwise affinity measure of a first patch pair 541 is larger than a pairwise affinity measure of a second patch pair 542.

Figure 5E:
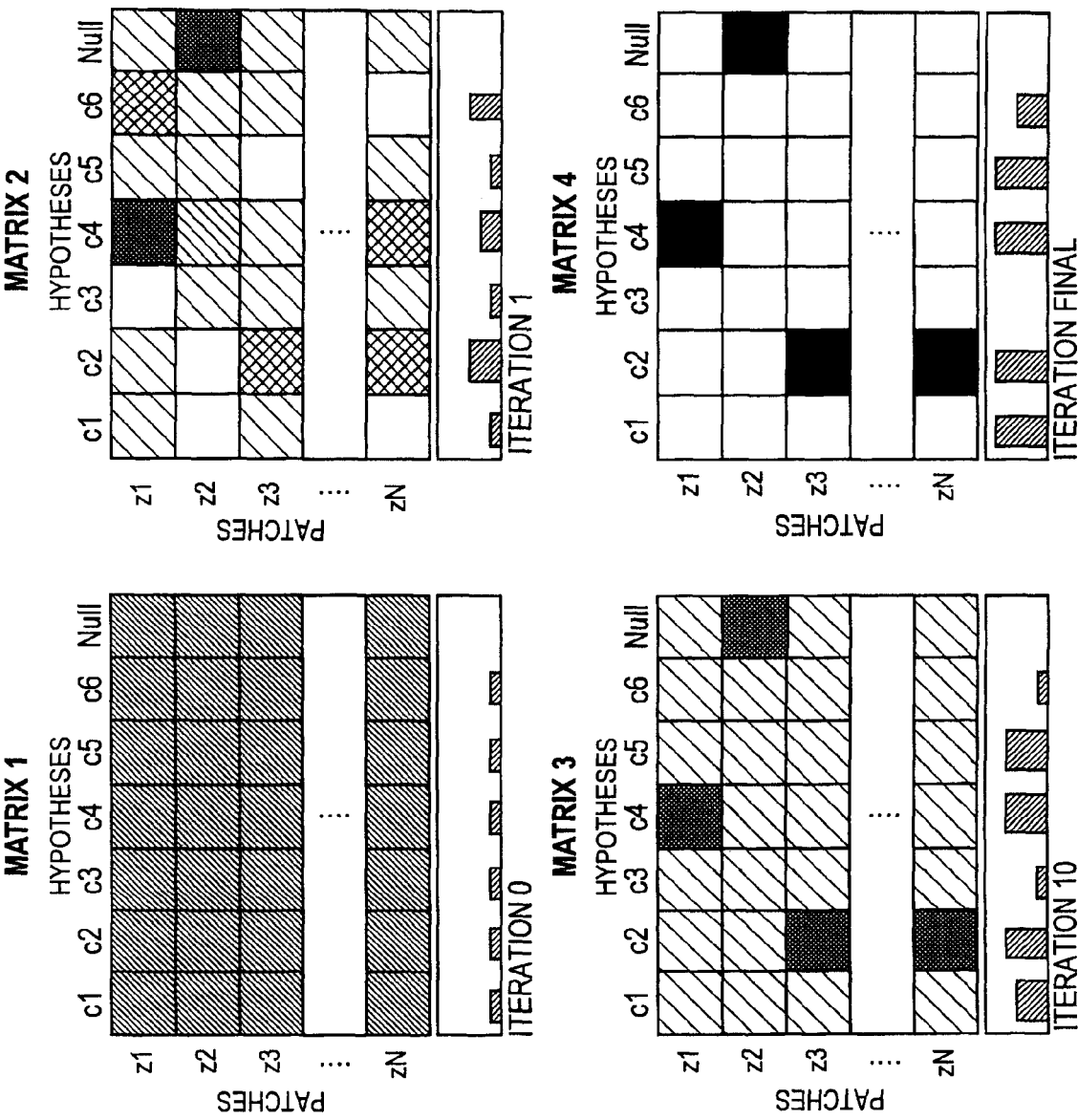

FIG. 5E shows matrixes 1-4 for illustrating an E-step of an EM algorithm that uses a soft-assign mechanism. Each matrix can include a horizontal dimension and a vertical dimension. The horizontal dimension can include indexes for the plurality of hypothesis, and the vertical dimension can include indexes for patches. It is noted the plurality of hypothesis may include a null hypothesis for background and/or non-person objects. Each element in the matrixes can indicate a probability of assigning a corresponding patch to a corresponding hypothesis of the element. It is also noted that a sum of probabilities in a row can be "1".

Matrix 1 shows a uniform initial assignment of probabilities; matrix 2 shows an assignment of probabilities after a first soft-assign iteration; matrix 3 shows an assignment of probabilities after the $10^{th}$ soft-assign iteration; and matrix 4 shows a final assignment of probabilities that have been forced into binary values.

FIG. 5F shows the patch-hypothesis assignment after a first E-step.

FIG. 5G shows patch assignments 571 that are considered as inconsistent based on occlusion reasoning in an M-step.

FIG. 5H shows the final segmentation 581-584 after multiple iterations of the E-step and the M-step.

Figure 6:
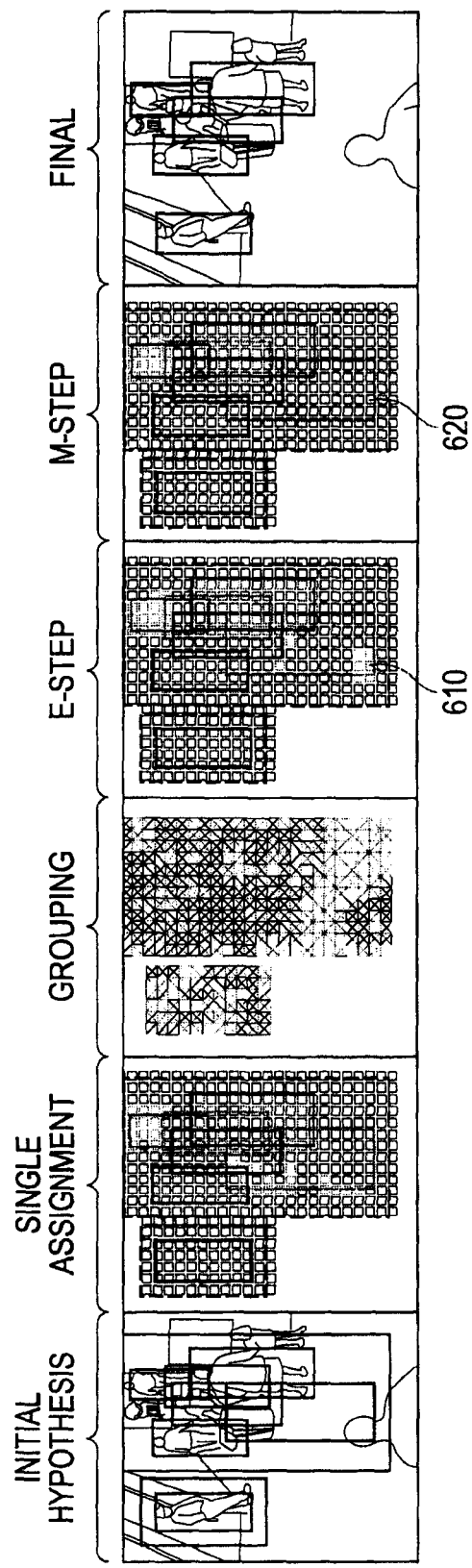
FIG. 6 shows an example using an appearance based crowd segmentation according to an embodiment of the disclosure.

FIG. 6 shows another example of plots illustrating an appearance based crowd segmentation according to an embodiment of the disclosure. The initial hypothesis plot shows a plurality of initial hypothesis and corresponding bounding boxes.

The single assignment plot shows a patch-hypothesis assignment that assigns a hypothesis with the largest direct affinity measure to a patch. It is noted that the dash line blocks are null hypothesis.

The grouping plot shows pairwise affinity measures of neighboring patches. The E-step plot shows the assignment of patches to hypothesis based on the first E-step in an iterative EM algorithm. It is noted that some assignments, such as patch assignments 610, may be inconsistent to the occlusion reasoning.

The M-step plot shows an assignment of patches to hypothesis after multiple iterations of E-step and M-step. It is noted that the inconsistent patch assignments can be corrected by updating the consistency parameters. The final plot shows the final segmentation.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for crowd segmentation, comprising:
    receiving an input image of a site;
    initializing a plurality of hypothesis based on the input image;
    dividing the input image into a plurality of patches;
    calculating an affinity measure of one or more patches to a hypothesis based on a partial response of the patches to a whole body classifier of the hypothesis that includes a combination of weak classifiers; and
    optimizing assignments of the plurality of patches to the plurality of hypothesis based on the affinity measures of the plurality of patches to the plurality of hypothesis.

2. The method of claim 1, wherein initializing the plurality of hypothesis based on the input image further comprises:
    detecting head and shoulder locations in the input image.

3. The method of claim 2, wherein detecting the head and shoulder locations in the input image further comprises:
    calculating a response to a head and shoulder classifier for a location; and
    determining the location as a hypothesis based on the response.

4. The method of claim 1, wherein dividing the input image into the plurality of patches further comprises:
    determining a patch size based on the whole body classifier.

5. The method of claim 1, further comprising:
    constructing the whole body classifier based on training data of the site.

6. The method of claim 1, wherein calculating the affinity measure of the patches to the hypothesis based on the partial response of the patches to the whole body classifier of the hypothesis, further comprises at least one of:
    calculating a direct affinity measure of a patch to the hypothesis; and
    calculating a pairwise affinity measure of a pair of patches to a hypothesis.

7. The method of claim 6, wherein calculating the pairwise affinity measure of the pair of patches to the hypothesis, further comprises:
    calculating a similarity measure of the pair of patches.

8. The method of claim 7, wherein calculating the similarity measure of the pair of patches further comprises:
    calculating the similarity measure of the pair of patches based on at least one of motion consistency and color consistency.

9. The method of claim 6, wherein calculating the direct affinity measure of the patch to the hypothesis further comprises:
    calculating a statistic over an intersection of the patch and a region of a weak classifier that is within the combination of the weak classifiers for the whole body classifier;
    calculating a response of the patch to the weak classifier based on the statistic; and scaling the response based on a ratio of the intersection and the region of the weak classifier.

10. The method of claim 1, wherein optimizing assignments of the plurality of patches to the plurality of hypothesis based on the affinity measures of the plurality of patches to the plurality of hypothesis, further comprises:

optimizing a global assignment of the patches to the plurality of hypothesis using an EM algorithm.

11. The method of claim 10, wherein optimizing the global assignment of the patches to the plurality of hypothesis using the EM algorithm, further comprises:

initializing consistency parameters;

computing an assignment distribution based on fixed consistency parameters in an E-step; and updating the consistency parameters to enforce a consistency of the global assignment in an M-step.

12. An image processing device for crowd segmentation, comprising:

an image input unit configured to receive an input image of a site;

a processing unit configured to initialize a plurality of hypothesis based on the input image, divide the input image into a plurality of patches, calculate an affinity measure of one or more patches to a hypothesis based on a partial response of the patches to a whole body classifier of the hypothesis, and optimize assignments of the plurality of patches to the plurality of hypothesis based on the affinity measures of the plurality of patches to the plurality of hypothesis; and an output unit configured to output the optimized assignments of the plurality of patches to the plurality of hypothesis.

13. The image processing device of claim 12, wherein the processing unit is further configured to detect head and shoulder locations in the input image.

14. The image processing device of claim 13, wherein the processing unit is further configured to calculate a response to a head and shoulder classifier for a location, and determine the location as a hypothesis based on the response.

15. The image processing device of claim 12, wherein the processing unit is further configured to determine a patch size based on the whole body classifier.

16. The image processing device of claim 12, wherein the processing unit is further configured to calculate at least one of a direct affinity measure of a patch to a hypothesis and a pairwise affinity measure of a pair of patches to a hypothesis.

17. The image processing device of claim 16, wherein the processing unit is configured to calculate a similarity measure of the pair of patches based on at least one of a motion constancy and a color constancy.

18. The image processing device of claim 16, wherein processing unit is configured to calculate a statistic over an intersection of the patch and a region of a weak classifier within the whole body classifier, calculate a response of the patch to the weak classifier based on the statistic, and scale the response based on a ratio of the intersection and the region of the weak classifier.

19. The image processing device of claim 12, wherein the processing unit is further configured to optimize a global assignment of the patches to the plurality of hypothesis in an E-step of an EM algorithm, and enforce a consistency of the global assignment in an M-step of the EM algorithm.

20. A non-transitory computer readable medium storing program instructions for causing a controller to perform crowd segmentation steps, comprising:

receiving an input image of a site;

initializing a plurality of hypothesis based on the input image;

dividing the input image into a plurality of patches;

calculating an affinity measure of one or more patches to a hypothesis based on a partial response of the patches to a whole body classifier of the hypothesis that includes a combination of weak classifiers; and optimizing assignments of the plurality of patches to the plurality of hypothesis based on the affinity measures of the plurality of patches to the plurality of hypothesis.

21. The non-transitory computer readable medium of claim 20, wherein the step to initialize the plurality of hypothesis based on the input image further comprises:

detecting head and shoulder locations in the input image.

22. The non-transitory computer readable medium of claim 21, wherein the step to detect the head and shoulder locations in the input image further comprises:

calculating a response to a head and shoulder classifier for a location; and determining the location as a hypothesis based on the response.

23. The non-transitory computer readable medium of claim 20, wherein the step to divide the input image into the plurality of patches further comprises:

determining a patch size based on the whole body classifier.

24. The non-transitory computer readable medium of claim 20, wherein the crowd segmentation steps further comprises:

constructing the whole body classifier based on training data of the site.

25. The non-transitory computer readable medium of claim 20, wherein the step to calculate the affinity measure of the patches to the hypothesis based on the partial response of the patches to the whole body classifier of the hypothesis, further comprises at least one of:

calculating a direct affinity measure of a patch to the hypothesis; and calculating a pairwise affinity measure of a pair of patches to a hypothesis.

26. The non-transitory computer readable medium of claim 25, wherein the step to calculate the pairwise affinity measure of the pair of patches to the hypothesis, further comprises:

calculating a similarity measure of the pair of patches.

27. The non-transitory computer readable medium of claim 26, wherein step to calculate the similarity measure of the pair of patches further comprises:

calculating the similarity measure of the pair of patches based on at least one of motion consistency and color consistency.

28. The non-transitory computer readable medium of claim 25, wherein the step to calculate the direct affinity measure of the patch to the hypothesis further comprises:

calculating a statistic over an intersection of the patch and a region of a weak classifier that is within the combination of the weak classifiers for the whole body classifier;

calculating a response of the patch to the weak classifier based on the statistic; and scaling the response based on a ratio of the intersection and the region of the weak classifier.

29. The non-transitory computer readable medium of claim 20, wherein the step to optimize assignments of the plurality of patches to the plurality of hypothesis based on the affinity measures of the plurality of patches to the plurality of hypothesis, further comprises:

optimizing a global assignment of the patches to the plurality of hypothesis using an EM algorithm.

30. The non-transitory computer readable medium of claim 29, wherein the step to optimize the global assignment of the patches to the plurality of hypothesis using the EM algorithm, further comprises:

initializing consistency parameters;

computing an assignment distribution based on fixed consistency parameters in an E-step; and updating the consistency parameters to enforce a consistency of the global assignment in an M-step.

* * * * *

UNITED STATES PATENT AND TRADEMARK OFFICE
CERTIFICATE OF CORRECTION

| | |
|---|---|
| PATENT NO. | : 8,355,576 B2 |
| APPLICATION NO. | : 12/457543 |
| DATED | : January 15, 2013 |
| INVENTOR(S) | : Peter H. Tu et al. |

It is certified that error appears in the above-identified patent and that said Letters Patent is hereby corrected as shown below:

On the title page, Item (75), the 1$^{st}$ Inventor's address information is incorrect. Item (75) should read:

--(75) Inventors: Peter H. Tu, Niskayuna, NY (US);
Kenneth R. Turner, Bristow, VA (US);
Jens Rittscher, Ballston Lake, NY (US);
Thomas B. Sebastian, Niskayuna, NY (US);
Nils Oliver Krahnstoever, Schenectady, NY (US);
Gianfranco Doretto, Albany, NY (US);
Ting Yu, Schenectady, NY (US)--

Signed and Sealed this
Fourth Day of June, 2013

Teresa Stanek Rea
*Acting Director of the United States Patent and Trademark Office*